(12) United States Patent
Gautron et al.

(10) Patent No.: US 9,626,791 B2
(45) Date of Patent: Apr. 18, 2017

(54) METHOD FOR REPRESENTING A PARTICIPATING MEDIA IN A SCENE AND CORRESPONDING DEVICE

(71) Applicant: THOMSON LICENSING, Issy de Moulineaux (FR)

(72) Inventors: Pascal Gautron, Rennes (FR); Jean-Eudes Marvie, Betton (FR); Cyril Delalandre, Montreuil le Gast (FR)

(73) Assignee: Thomson Licensing, Issy-les-Moulineaux (FR)

( * ) Notice: Subject to any disclaimer, the term of this patent is extended or adjusted under 35 U.S.C. 154(b) by 46 days.

(21) Appl. No.: 14/386,375

(22) PCT Filed: Mar. 22, 2013

(86) PCT No.: PCT/EP2013/056130
§ 371 (c)(1),
(2) Date: Sep. 19, 2014

(87) PCT Pub. No.: WO2013/144029
PCT Pub. Date: Oct. 3, 2013

(65) Prior Publication Data
US 2015/0042642 A1    Feb. 12, 2015

(30) Foreign Application Priority Data
Mar. 26, 2012    (FR) .................................. 12 52675

(51) Int. Cl.
*G06T 15/20*    (2011.01)
*G06T 15/06*    (2011.01)
*G06T 15/50*    (2011.01)

(52) U.S. Cl.
CPC .............. *G06T 15/20* (2013.01); *G06T 15/06* (2013.01); *G06T 15/50* (2013.01); *G06T 2210/12* (2013.01)

(58) Field of Classification Search
None
See application file for complete search history.

(56) References Cited

U.S. PATENT DOCUMENTS

2009/0006044 A1 *    1/2009    Zhou ....................... G06T 15/55
                                                                  703/2
2009/0006052 A1 *    1/2009    Zhou ....................... G06T 15/50
                                                                  703/5
2009/0284524 A1    11/2009    Shearer et al.

FOREIGN PATENT DOCUMENTS

| CN | 101894390 | 11/2010 |
| EP | 2428935 | 3/2012 |
| FR | 2964776 | 3/2012 |

OTHER PUBLICATIONS

Cerazo et al: "A Survey on Participating Media Rendering Techniques", The Visual Computer; International Journal of Computer Graphics, vol. 21, N°5, Jun. 1, 2005 (Jun. 1, 2005), pp. 303-328.

(Continued)

*Primary Examiner* — Michelle Chin
(74) *Attorney, Agent, or Firm* — Myers Wolin LLC

(57) ABSTRACT

A method and device for rendering a participating media delimited by a bounding box and rendered from a viewpoint, the media being at a determined distance from the viewpoint according to a viewing direction. In order to represent the limits of the participating media, the method comprises for at least one point of the volume formed by the bounding box, estimating a set of directions having for origin the at least one point; for each direction, estimating a first intersection point, corresponding to the intersection between the direction and the participating media, for which the associated (Continued)

Figure 1:
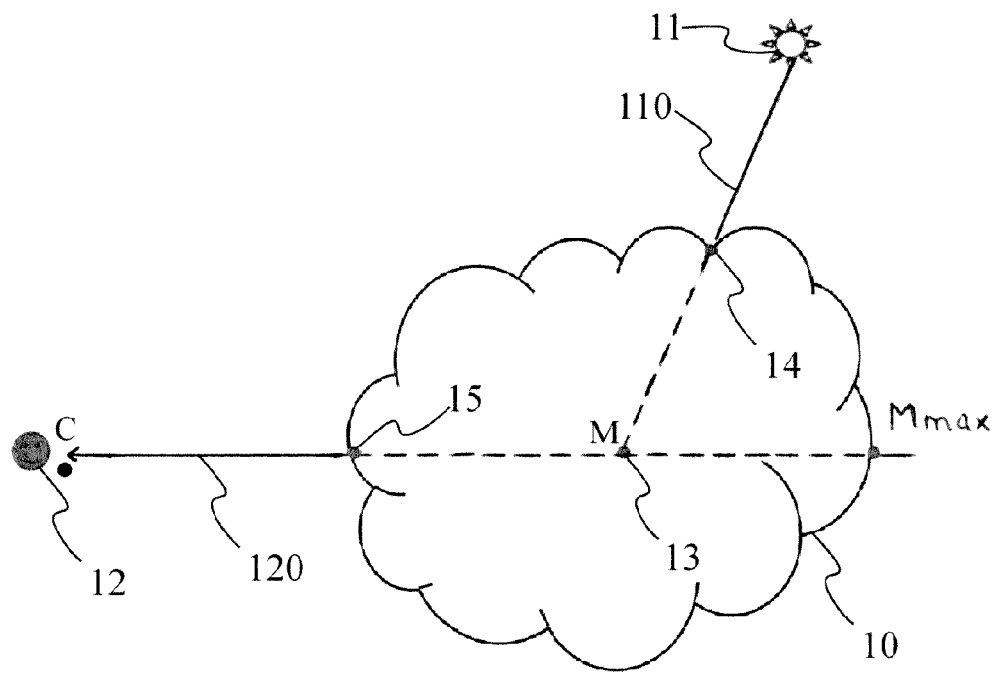

density value is greater than a first threshold value; and estimating third intersection points, corresponding to the intersections between the viewing direction and the participating media, from an item of information representative of distances separating the first intersection point from a second intersection point corresponding to the intersection between the direction and the bounding box for each direction of the at least one part of the set of estimated directions.

18 Claims, 5 Drawing Sheets

(56) References Cited

OTHER PUBLICATIONS

Search Report Dated May 3, 2013.
Hao etal—A real time rendering method of non homogeneous participating media—Feb. 2009.

* cited by examiner

METHOD FOR REPRESENTING A PARTICIPATING MEDIA IN A SCENE AND CORRESPONDING DEVICE

This application claims the benefit, under 35 U.S.C. §365 of International Application PCT/EP2013/056130, filed Mar. 22, 2013, which was published in accordance with PCT Article 21(2) on Oct. 3, 2013 in English and which claims the benefit of French patent application No. 1252675 filed Mar. 26, 2012

1. SCOPE OF THE INVENTION

The invention relates to the field of composition of computer generated pictures, and more particularly to the field of a representation of a participating media, whether homogeneous or heterogeneous, in a computer generated picture. The invention also falls within the scope of special effects for a live composition.

2. PRIOR ART

According to the prior art, different methods exist for simulating the diffusion of light in participating media such as for example fog, smoke, dust or clouds. The participating media correspond to media composed of airborne particles which interact with the light to modify its path and intensity in particular.

The participating media can be broken down into two parts, i.e. homogeneous media, such as water and heterogeneous media, such as smoke or clouds. In the case of homogeneous participating media, it is possible to calculate, in an analytical manner, the attenuation of the light sent by a light source. Indeed, as a result of their homogeneous nature, these media present parameters such as the light absorption coefficient or the light diffusion coefficient of constant value at any point of the media. Conversely, the light absorption and diffusion properties vary from one point to another in a heterogeneous participating media. The calculations required to simulate the diffusion of light in such a heterogeneous media are then very costly and it is thus not possible to calculate analytically and live the quantity of light diffused by a heterogeneous participating media. In addition, the media not being diffused (that is to say the diffusion of the media being anisotropic), the quantity of light diffused by the media also varies according to the direction of diffusion of the light, that is to say the direction in which a person views this media. Calculations estimating the quantity of light diffused must then be reiterated for each direction of observation of the media by a person in order to obtain a realistic rendering of the media.

Figure 2:
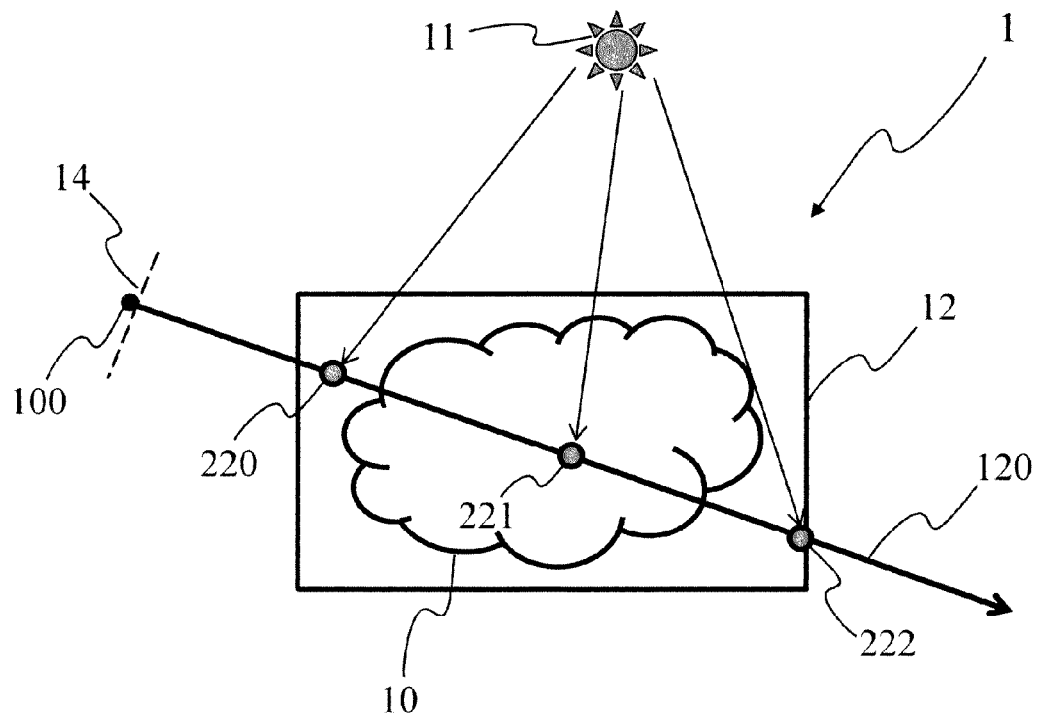

If a virtual scene 1 is considered such as illustrated in FIG. 2, scene 1 comprising a participating media 10, for example a cloud, it is known to sample a ray 13 having for origin a pixel P 100 of an image plane 14, the image 14 corresponding to a view of the scene from a given viewpoint. The purpose for sampling the ray 13 is to be able to calculate in an analytical manner the quantity of light received from the light source 11 by each of the samples 220, 221 and 222 of the ray 13. To calculate the quantity of light received at the level of the pixel P 100, the sum of the quantities of light emitted by each of the samples of the ray 13 is calculated. As only the particles of the participating media have the property of diffusing the light received from the light source, only the part of the ray crossing the participating media 10 needs to be sampled. As the limits of the participating media are not clearly defined, it is known to generate a bounding box 12 surrounding the volume formed by the participating media 10, only the part of the ray comprised within this bounding box 12 being sampled. To reduce the calculations required for the quantity of light received at the level of the pixel P by the participating media 10, it is known to limit the number of samples of the ray 13 comprised in the bounding box, particularly when the participating media is at a distance far from the pixel P, the participating media contribution to the lighting of the pixel P 100 being all the less important as the participating media 10 is distant from the pixel P 100.

One of the problems posed by such a subsampling of the ray 13 crossing the bounding box is that the number of samples actually belonging to the participating media can be low with regard to the total number of samples, which leads to defects or important errors in the estimation of the quantity of light diffused by the participating media 10. Such a problem is illustrated by FIG. 2 for which three samples 220, 221 and 222 of the ray 13 on the segment comprised in the bounding box, only the sample 221 actually belongs to the participating media 10, both other samples 220 and 222 belonging to the bounding box but not to the participating media 10. As only the samples belonging to the participating media 10 are able to diffuse the light received from the light source 11, the estimation of the quantity of light diffused by the participating media 10 will be very approximative. In the example of FIG. 2, only one sample in three actually represents the participating media 10 and contributes to the calculation of the diffusion of the light.

3. SUMMARY OF THE INVENTION

The purpose of the invention is to overcome at least one of these disadvantages of the prior art.

More particularly, the purpose of the invention is to optimise the representation of a participating media to compose a live realistic rendering of a virtual scene.

The invention relates to a method for rendering a participating media comprised in a scene, the media being delimited by a bounding box, the media being rendered from a viewpoint at a determined distance from the viewpoint according to a viewing direction. In order to represent the participating media, and particularly its limits in the scene, the method comprises the steps of:

for at least one point of the volume formed by said bounding box, estimation of a set of directions having for origin the at least one point and distributed according to at least one half-sphere of which the base is centred on the at least one point, for each direction of at least one part of the set of estimated directions, estimation of a first intersection point, corresponding to the intersection between the direction and the participating media, for which the associated density value is greater than a first threshold value, the first intersection point being estimated by starting from a second intersection point corresponding to the intersection between the direction and the bounding box, and estimation of third intersection points, corresponding to the intersections between the viewing direction and the participating media, from an item of information representative of distances separating the first intersection point from the second intersection point for each direction of the at least one part of the set of estimated directions.

According to a particular characteristic, the method comprises a step for estimating projection coefficients in a functions base from values representative of a distance separating the first intersection point from the second intersection point, the item of information representative of distances corresponding to the estimated projection coefficients.

According to a specific characteristic, the distance separating the participating media of the viewpoint according to the viewing direction is greater than a second threshold value, the at least one point of the volume formed by the bounding box corresponds to the centre of the bounding box, the set of estimated directions is distributed according to a sphere centred on the centre of the bounding box.

Advantageously, the functions base is a spherical functions base.

According to a particular characteristic, the distance separating the participating media from the viewpoint according to the viewing direction is less than a second threshold value and greater than a third threshold value, the method comprises a step for sampling the surface of the bounding box into a plurality of samples, a set of directions is estimated for a plurality of points corresponding to at least one part of the plurality of samples, each set of directions being estimated according to a half-sphere centred on the considered sample of the sample plurality, the base of the half-sphere belonging to the surface of the bounding box, the half-sphere being oriented toward the inside of said bounding box, the third intersection points being moreover estimated from a fourth intersection point corresponding to the intersection between the viewing direction and the bounding box.

Advantageously, when the fourth intersection point does not correspond to one of the samples of the surface of the bounding box, the method comprises a step for determining a sample of the surface of the bounding box corresponding to the fourth intersection by interpolation of the samples surrounding the fourth intersection point.

According to a particular characteristic, the method comprises a step for sampling the viewing direction between the estimated third intersection points.

According to another characteristic, the participating media is a heterogeneous participating media.

The invention also relates to a device configured for rendering a participating media comprised in a scene, the media being delimited by a bounding box, the media being rendered from a viewpoint at a determined distance from the viewpoint according to a viewing direction, the device comprising:
  means for estimating, for at least one point of the volume formed by said bounding box, a set of directions having for origin the at least one point and distributed according to at least one half-sphere of which the base is centred on the at least one point,
  means for estimating, for each direction of at least one part of the set of estimated directions, a first intersection point, corresponding to the intersection between the direction and the participating media, for which the associated density value is greater than a second threshold value, the first intersection point being estimated by starting from a second intersection point corresponding to the intersection between the direction and the bounding box,
  means for estimating third intersection points, corresponding to the intersections between the viewing direction and the participating media, from an item of information representative of distances separating the first intersection point from the second intersection point for each direction of the at least one part of the set of estimated directions.

Advantageously, the device comprises means for estimating projection coefficients in a functions base from values representative of a distance separating the first intersection point from the second intersection point.

According to a particular characteristic, the device comprises means for sampling the surface of the bounding box and a plurality samples.

According to another characteristic, the device comprises means for sampling the viewing direction between the third estimated intersection points.

The invention also relates to a computer program product comprising program code instructions for the execution of the steps of the method for rendering a participating media when the program is executed on a computer.

The invention further relates to a computer readable storage means, storing the set of computer executable instructions to implement the method for rendering a participating media.

4. LIST OF FIGURES

Figure 3:
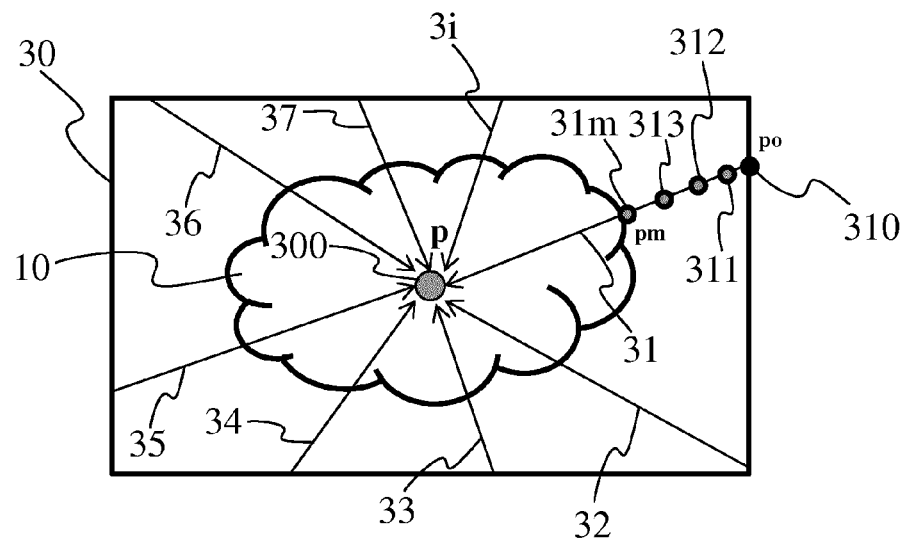
Figure 4:
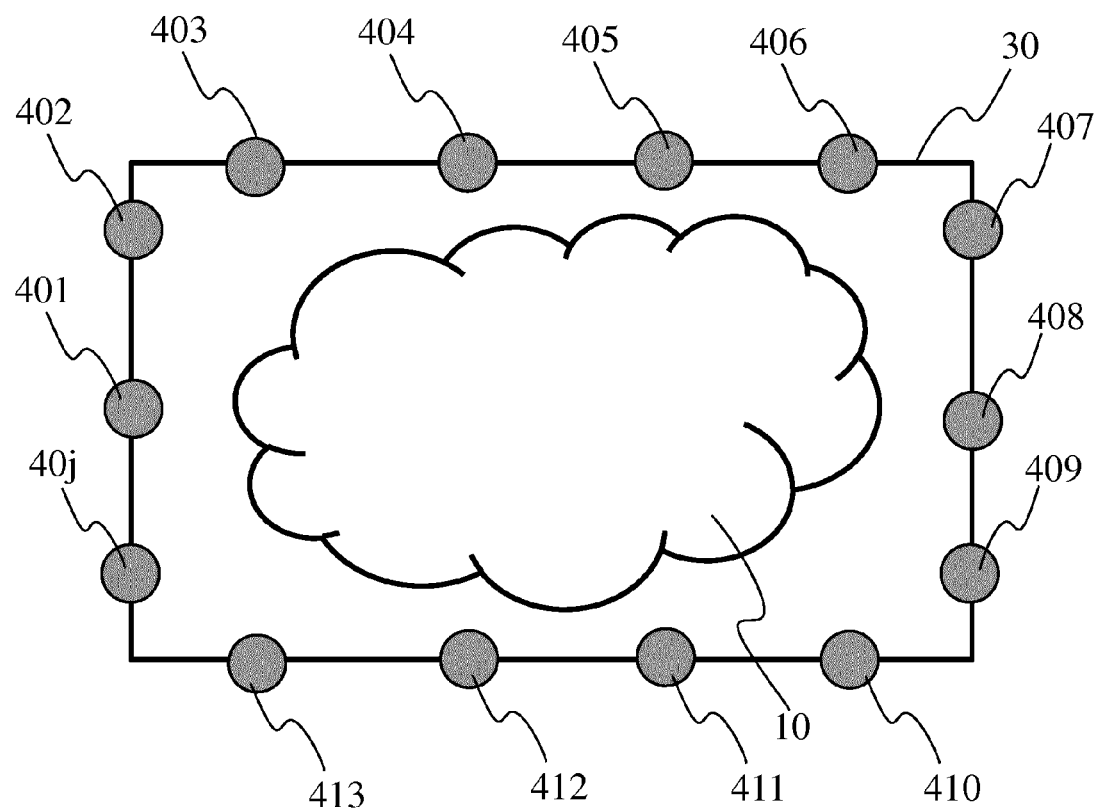
Figure 5:
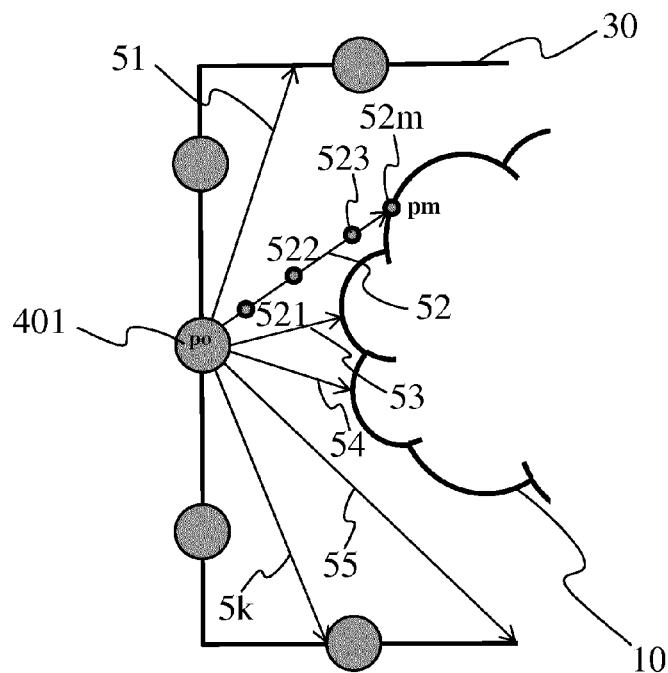
Figure 6:
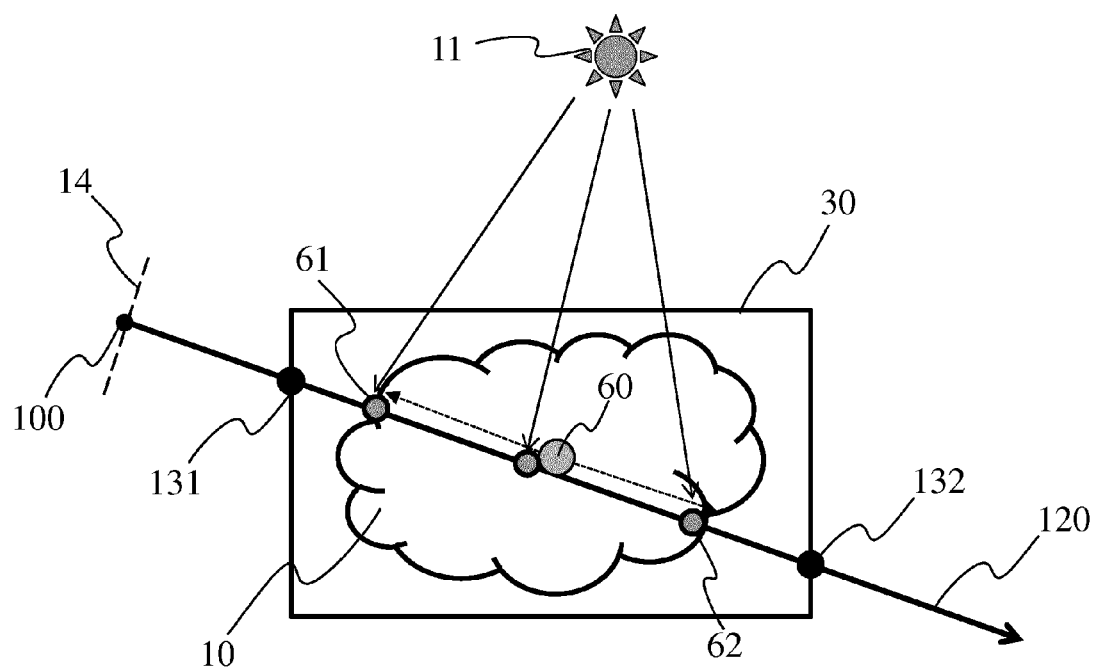
Figure 7:
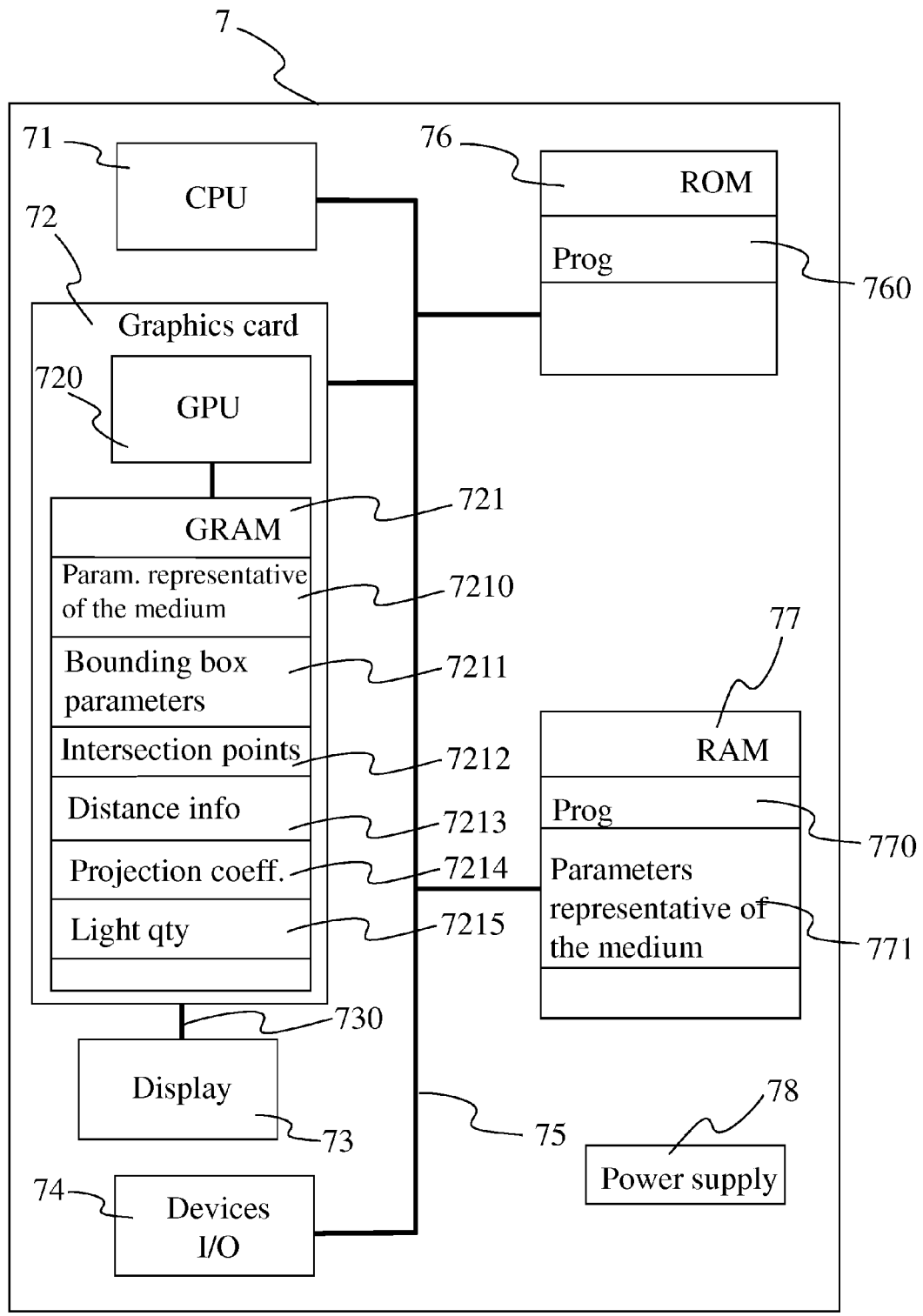
Figure 8:
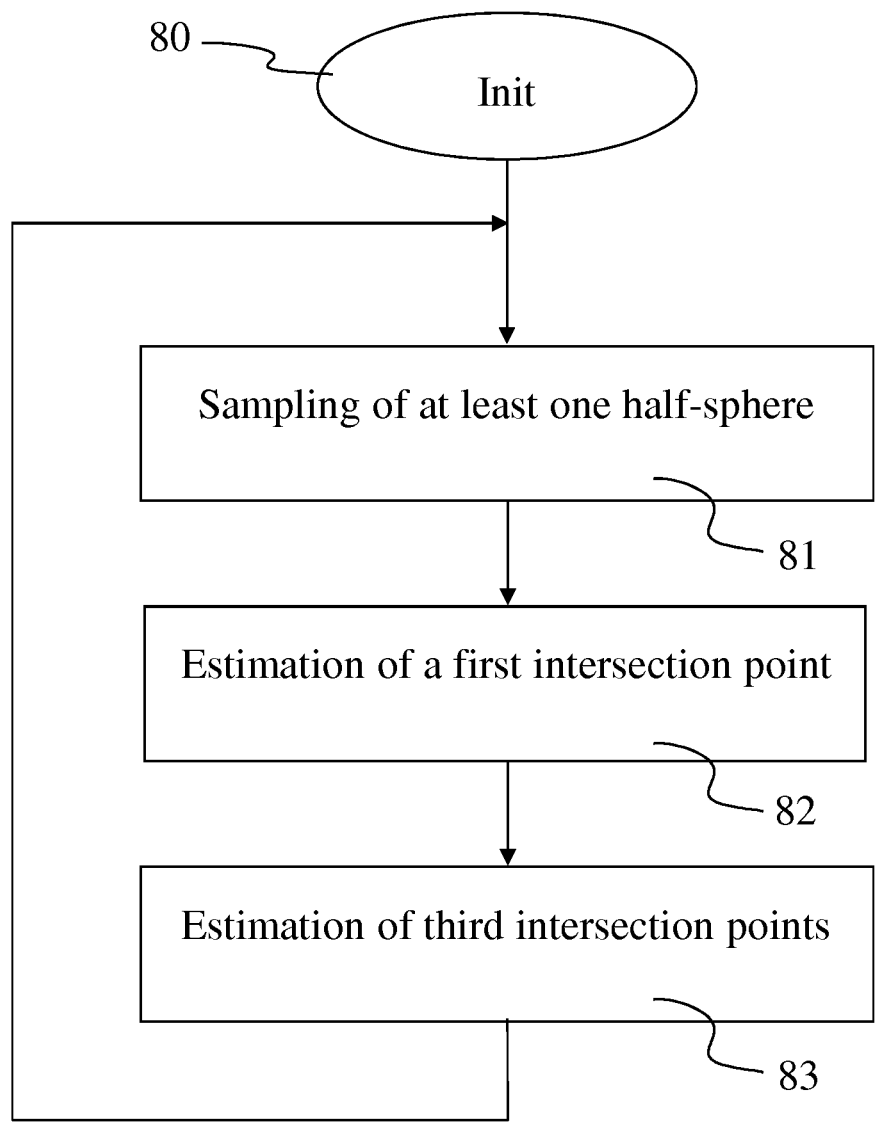

The invention will be better understood, and other specific features and advantages will emerge upon reading the following description, the description making reference to the annexed drawings wherein:

FIG. 1 diagrammatically illustrates a participating media diffusing light, according to a particular embodiment of the invention, FIG. 2 illustrates a method for sampling a participating media according to the prior art, FIG. 3 illustrates a step for representing a participating media of FIG. 1, according to a first particular embodiment of the invention, FIGS. 4 and 5 illustrate a step for representing a participating media of FIG. 1, according to a second particular embodiment of the invention, FIG. 6 diagrammatically illustrates a participating media of FIGS. 3, 4 and 5, according to a particular embodiment of the invention, FIG. 7 illustrates a device implementing a method for rendering a participating media of FIG. 1, according to a particular implementation embodiment of the invention, FIG. 8 illustrates a method for rendering a participating media of FIG. 1, according to a particular implementation embodiment of the invention,

5. DETAILED DESCRIPTION OF EMBODIMENTS OF THE INVENTION

FIG. 1 shows a heterogeneous participating media 10, for example a cloud. A participating media is a media, composed of a multitude of particles in suspension, that absorbs, emits and/or diffuses light. In its simplest form, a participating media only absorbs light, for example light received from a light source 11 such as the sun for example. This means that light passing through the media 10 is attenuated, the attenuation depending on the density of the media. The participating media 10 is for example heterogeneous, that is to say that the physical characteristics of the media, such as the density of particles composing it for example, vary from one point to another in the media. As the participating media is composed of small particles that interact with the light, the incident light, that is to say received from the light source 11 according to a direction $\omega_{in}$ 110 is not only absorbed but it is also diffused. In a participating media with isotropic diffusion, the light is diffused uniformly in all directions. In an anisotropic diffusion participating media, such as the cloud 10 shown in FIG. 1, the light diffusion depends on the angle between the direction of incidence $\omega_{in}$ 110 and the direction of diffusion $\omega_{out}$ 120 of the light. The quantity of light diffused at a point M 13 of the media 10 in the direction of diffusion $\omega_{out}$ 120 is calculated by the following equation:

$$Q(M,\omega_{out})=D(M)\cdot\sigma_s\cdot p(M,\omega_{out},\omega_{in})\cdot L_{ri}(M,\omega_{in}) \quad \text{Equation 1}$$

The quantity of light diffused by a point M 13 of the media reaching the eye of a viewer 12 located in a point C of the space in the direction $\omega_{out}$ 120, i.e. the quantity of light diffused by point M and attenuated by the media 10 over the path M-P, point P being located at the intersection of the media 10 and of the direction $\omega_{out}$ in the direction of the viewer 12, then is:

$$L_P(M,\omega_{out})=Q(M,\omega_{out})\cdot\exp\int_P^{M-D(s)\circ}_t ds \quad \text{Equation 2}$$

for which:
$\sigma_s$ is the diffusion coefficient of the media,
$\sigma_a$ is the absorption coefficient of the media,
$\sigma_t=\sigma_s+\sigma_a$ is the extinction coefficient of the media,
D(M) is the density of the media at a given point, the density varying from one point to another as the media 10 is heterogeneous,
p(M, $\omega_{out}$, $\omega_{in}$) is the phase function describing how the light coming from the direction of incidence $\omega_{in}$ is diffused in the direction of diffusion $\omega_{out}$ at point M,
$L_{ri}(M,\omega_{in})$ is the reduced light intensity at the point M coming from the direction of incidence $\omega_{in}$ 110 and represents the quantity of incident light arriving at the point M after attenuation due to the trajectory of the light in the media 10 on the segment K-M, K being the intersection point between the media 10 and the incidence ray $\omega_{in}$ 110, and its value is:

$$\exp\int_M^{K-D(s)\circ}_t ds \quad \text{Equation 3}$$

$\exp\int_P^{M-D(s)\circ}_t ds$ represents the diffused luminance attenuation due to the absorption and diffusion along the path from P 15 to M 13.

Equation 2 enables the quantity of light diffused by a point M and attaining the eye of a spectator 12 situated on the direction $\omega_{out}$ to be calculated. To calculate the quantity of light received by a viewer looking in direction $\omega_{out}$, it is then necessary to add up all the contributions of all the points of the media located on axis $\omega_{out}$, i.e. the points located on segment P-$M_{max}$, P and $M_{max}$ being the two points of intersection between the media 10 and the direction $\omega_{out}$ 120. This total diffused luminance arriving in P 15 from direction $\omega_{out}$ 120 due to simple diffusion then is:

$$L(P,\omega_{out})=\int_P^{Mmax}L_p(M,\omega_{out})dM \quad \text{Equation 4}$$

In this case, it is considered that the light following the trajectory C-P is not attenuated.

This total diffused luminance is obtained by integrating the contributions of all the points located between P and $M_{max}$ on a radius having $\omega_{out}$ as direction. Such an integral equation cannot be resolved analytically in general and even less so for a live estimation of the quantity of light diffused. The integral is evaluated digitally using the method known as ray-marching. In this method, the integration domain is discretized into a multitude of intervals of size $\delta_M$ and the following equation is obtained:

$$L(P,\omega_{out})\approx\Sigma_P^{Mmax}L_p(M,\omega_{out})\delta_M \quad \text{Equation 5}$$

Advantageously, the heterogeneous participating media 10 is a three-dimensional element, shown in two dimensions on FIG. 1 for reasons of clarity.

According to a variant, the media 10 is lit by a plurality of light sources, for example 1000, 100,000 or 1,000,000 light sources, the light sources forming a light environment. The estimation of the light from several remote light sources is carried out using the environment mapping method known to those skilled in the art. According to the environment mapping method, it is considered that all the light sources of the light environment are located at optical infinity in relation to the points of the media 10. It is thus possible to consider that the directions taken by the light emitted by different light sources are identical irrespective of the considered points of the media. The parallax effect due to the distance separating different points of the media is thus negligible. According to this variant, to estimate the attenuation of the incident light at a point M, it is necessary to calculate the attenuation of the light via the equation 7 for a set of directions of incidence representative of the light environment, which significantly increases the calculations.

According to another variant, the physical characteristics of the media 10, such as the diffusion coefficient $\sigma_s$ of the media and/or the absorption coefficient $\sigma_a$ of the media, also vary from one point to another in the media 10, as does the density. According to an additional variant, only one of the two or both coefficients $\sigma_s$ and $\sigma_a$ vary in the media, the density being homogeneous in the media.

FIG. 3 shows a step for rendering a participating media 10, according to a non-restrictive particular embodiment of the invention, A bounding box 30 is advantageously defined around the participating media 10, that is that the volume formed by the participating media 10 is surrounded by a box of an advantageously rectangular or square parallelepipedic shape or any other shape. The bounding box can provide a rapid estimation of the volume occupied by the participating media 10 in the virtual scene 1. The use of a bounding box, also called bounding volume, can simplify and accelerate all the geometric calculations involving the participating media 10, the geometry of the bounding box being simpler than that of the participating media, whose shape can be complex. The bounding box is generated so as to include all the geometry of the participating media, a space existing between the inner surface of the bounding box and the outer surface of the participating media, at least in places.

According to the embodiment of FIG. 3, the participating media is located at a large distance from the viewpoint according to which this participating media 10 is observed, that at a distance greater that a second threshold value. It is advantageously considered that a participating media is at a distance greater than the second threshold value if the projected surface of the bounding box that surrounds the image plane is less than for example 5%, 10%, 15% of the total surface of the image plane. It can thus be considered that, irrespective of the direction according to which one looks at the participating media, the direction of observation passes through the centre P 300 of the bounding box surrounding the participating media 10. A sphere of centre P is thus advantageously sampled in i directions 31, 32, 33, 34, 35, 36, 37 and 3i, i being a whole number greater than or equal to 2, for example equal to 10, 100, 1000 or 10000.

For each of these directions 31 to 3i, the intersection point with the surface of the bounding box is calculated by any geometric method known by those skilled in the art. By taking direction 31 for example, the intersection point between the direction 31 and the surface of the bounding box 30 corresponds to the point $P_0$ 310. Starting from this intersection point $P_0$, the straight line segment [$P_0P$] is followed along the direction 31 going toward P 300 up to meeting a point $P_m$ 31m for which the density value that is associated with it is greater than a first threshold. This first threshold value advantageously corresponds to a density value representative of the minimum density of a particle of a participating media. The point Pm advantageously corresponds to the first intersection between the direction 31 and the participating media 10 starting from the surface of the bounding box. The point Pm 31m is sought for example by using a ray tracing or ray marching method). According to a variant, the point Pm 310 is sought by using a dichotomic search method according to which the segment [P₀P] is cut in half iteratively until the point Pm 31m is found having an associated density value greater than the first threshold value. The first threshold value is advantageously a predetermined system value. According to a variant, the first threshold value is a parameter entered by a user of the system carrying out the rendering of the participating media.

Once the intersection point Pm 31m is determined, the distance separating this first intersection point Pm 31m (corresponding to the intersection between the direction 31 and the outer envelope (or the surface in other words) from the participating media 10) of the second intersection point P₀ 310 (corresponding to the intersection between the direction 31 and the surface of the bounding box) is determined, this distance corresponding to the standard ∥P₀Pm∥, this distance being determined from coordinates at these points P₀ and Pm of the virtual scene 1.

This process is advantageously reiterated for each of the remaining directions 32 to 3i to estimate the distance separating a first intersection point, corresponding to the intersection between the relevant direction and the outer envelope of the media, and a second intersection point, corresponding to the intersection between the relevant direction and the surface of the bounding box 30. These distances separating the first intersection point from the second intersection point for each direction are for example stored in a memory to be reused in the calculations done to sample the participating media.

According to an advantageous variant, these distances separating the first intersection point from the second intersection point along each direction 31 to 3i are projected onto a set of base functions, such as spherical harmonics for example. Each function of the functional space can be written as a linear combination of base functions, a base function being an element of a base for a functional space. By using an orthonormal base of spherical functions, it is possible to represent the function representative of the distances between the first points and second points at the point P by:

$$D(P) \approx \Sum_{j=1}^{Nc} Cr_j(P) B_j(P) \quad \text{Equation 6}$$

where D(P) is the limit function representative of the distances between the first intersection points and the second intersection points, $Cr_j(M)$ is the $j^{st}$ projection coefficient (on a total of Nc coefficients) of the base function $B_j(P)$ and where $Cr_j(P)$ is defined by the whole number on the sphere Ω of centre P, that is to say:

$$Cr_j(P) = \int_\Omega R(P,\omega) B_j(\omega) d\omega \quad \text{Equation 7}$$

The set Nc (for example 16 or 32 coefficients) of base function projection coefficients thus calculated is stored in a memory table of the GPU. These coefficients are representative of the distances separating the first intersection points from the second intersection points along the i directions forming the sphere Ω. The use of projection coefficients representative of the limit function can limit the memory space required to store the distance information between the first intersection points and the second intersection points. According to a variant, the distances are projection onto base functions of the wavelet type, the spherical harmonics being however particularly suited to show gently varying distances, which is generally the case with the limits of translucent media such as clouds.

According to a variant, the distances separating the centre P 300 of the bounding box from the first intersection points (corresponding to the intersection between each direction 31 to 3i and the participating media 10) are estimated instead of the distances separating the first intersection points from the second intersection points. The limit function representative of these distances is thus determined as described above.

FIGS. 4 and 5 illustrate a second embodiment for estimating distances between the surface of the bounding box 30 and the outer envelope of the participating media 10. This second embodiment is more suited for the representation of the participating media located at a distance averagely distant from the viewpoint, that is at a distance less that the second threshold value defined in the first embodiment described with respect to the figure, but greater that a third threshold value representative of a distance. A participating media is considered as being at a distance greater than the third threshold value if the projected surface of the bounding box surrounding the media on the image plane is less than 25% or 30% of the total surface of the image plane. This embodiment is more particularly suited to the representation of participating media located at a distance from the viewpoint such that it cannot be considered that all the viewing directions pass through a same point of the participating media 10.

FIG. 4 illustrates a first step of the second embodiment. During this step, the surface of the bounding box 30 bounding the participating media 10 is sampled into j samples 401, 402, . . . , 4120, 40j, j being a whole number greater than or equal to 2. The number j of samples is chosen to represent the surface of the bounding box with a certain accuracy, the degree of accuracy being chosen according to the number of calculations that can be handled by the graphics card on which the invention is implemented, particularly when live constraints exist for the rendering of the virtual scene comprising the participating media 10.

FIG. 5 illustrates a second step of the second embodiment, by taking one of the samples 401 among the plurality of samples 401 to 40j as example. A half-sphere is defined with for centre the sample 401 (that can be assimilated to a point P₀), for base a part of the surface of the bounding box and directed mainly towards the interior of the bounding box, that is oriented towards the participating media. This half-sphere is sampled into a plurality of k directions 51, 52, 53, 54, 55, 5k, k being a whole number greater than or equal to 2.

For each of these directions 51 to 5k, the intersection point with the surface of the bounding box, called second intersection point, is not calculated as for the first embodiment as it is know and corresponds to the point P₀ representative of the considered sample 401. Taking the direction 52 for example and starting from P₀ 401, the direction 52 is covered by moving away from P₀ 401 until meeting, after going through points 521, 522 and 523, a point $P_m$ 52m for which the density value that is associated with it is greater than a first threshold value. This first threshold value advantageously corresponds to a density value representative of the minimum representative density of a particle of a participating media. The point $P_m$ 52m advantageously corresponds to the first intersection between the direction 52 and the participating media 10 starting from the surface of the bounding box. In the same manner as the example described with regard to FIG. 3, the point Pm 52*m* is searched for example by using a ray tracing method or by using a dichotomic search method.

Once the intersection point Pm 52*m* (called first intersection point) is determined, the distance separating this first intersection point Pm 52*m* from the second intersection point $P_0$ 401 is determined, this distance corresponding to the standard $\|P_0 Pm\|$, this distance being determined from coordinates associated with these points $P_0$ and Pm of the virtual scene 1.

This process is advantageously reiterated for each of the remaining directions 52 to 5*k* to estimate the distance separating a first intersection point, corresponding to the intersection between the relevant direction and the outer envelope of the media, and a second intersection point, corresponding to the intersection between the relevant direction and the surface of the bounding box 30, that is at the centre of the half-sphere corresponding to the considered sample of the surface of the bounding box. These distances separating the first intersection point from the second intersection point for each direction are for example stored in a memory to be reused in the calculations done to sample the participating media. According to an advantageous variant, these distances separating the first intersection point from the second intersection point along each direction 35 to 5*i* are projected onto a set of base functions, such as hemispherical harmonics for example, according to the same principle as for the spherical harmonics described with regard to the embodiment illustrated by FIG. 3. A set Nc (for example 16 or 32 coefficients) of base function projection coefficients thus calculated is calculated then stored in a memory table of the GPU. These coefficients are representative of the distances separating the first intersection points from the second intersection points along the k directions forming the sphere $\Omega$.

Then, in an advantageous manner, the same process is reiterated for all or part of the samples 401 to 40*j* representative of the surface of the bounding box 30. Hence, an item of distance information representative of the distances separating the considered sample from the different intersection points between the k directions having for origin the considered sample and the envelope of the participating media 10 is determined for each sample 401 to 40*j*. Hence, an item of information representative of distance (that is a plurality of distance values or a plurality of projection coefficients representative of distance values) is associated with each considered sample of the surface of the bounding box 30 (and stored in a GPU memory table).

FIG. 6 illustrates the sampling of a viewing direction crossing the participating media, according to a non-restrictive particular embodiment of the invention, For a given viewing direction 120 corresponding to the direction from which a spectator observes the virtual scene 1, to each direction being associated a pixel of the image plane 14 that represents the image according to the viewpoint of the spectator, the two intersection points, called third intersection points, 61 and 62 between the viewing direction 120 on the one hand and the participating media 10 on the other are determined by using the distance information stored in memory. The distance information representing the distances between the surface of the bounding box 30 and the outer envelope of the participating media 10 advantageously defined the general shape of the participating media 10, which enables the real intersections between the viewing direction 120 and the participating media 10 to be found rapidly.

In the case where the participating media 10 is located at a distance averagely distant form the viewpoint, that is at a distance greater than the third threshold value defined previously, the intersection points, called fourth intersection points, 1201 and 1202 between the viewing direction and the bounding volume are determined before determining the third intersection points. Determining the fourth intersection points 1201, 1202 beforehand can enable what distance information to use for estimating the third intersection points 61, 62 to be known. Indeed, as has been described with regard to FIGS. 4 and 5, an item of distance information is associated with each sample 401 to 40*j* of the surface of the bounding box 30. To know what item of distance information to use, it is consequently necessary to know to what samples of the surface of the bounding box it must refer. When for example a determined fourth intersection point 1201 does not correspond to one of the sample points 401 to 40*j*, an item of distance information associated with this fourth intersection point is calculated by interpolating distance information associated with the sample points surrounding this fourth intersection point for which associated distance information is available.

Once the third intersection points 61, 62 (between the viewing direction 120 and the participating media 10) are determined, the straight line segment corresponding to the segment common to the viewing direction 120 and to the participating media 10, that is the straight line segment comprised between the two intersection points 61, 62, is sampled into a plurality of samples 60, the number of samples being chosen for having a good compromise between a faithful representation of the straight line segment and the calculation costs that result when rendering the participating media, the greater the number of samples, the costlier the calculations required for rendering the participating media.

The same sampling process is advantageously reiterated for several viewing directions in order to obtain a full representation of the participating media, and starting from there a full rendering (from the considered viewpoint) of the participating media. It is thus, for example, possible to estimate the quantity of light diffused by the participating media 10 in the direction of the viewpoint by using the equations described with regard to FIG. 1.

According to a variant, the sampling process is reiterated for several viewpoints, for example in the case where the virtual scene 1 comprising the participating media 10 is a video game scene in which the avatar of a player is moving, the viewpoints of the scene vary as the avatar moves in the scene.

FIG. 7 diagrammatically illustrates a hardware embodiment of a device 7 suited to the rendering of a participating media 10 and to the creation of signals for displaying one or more images. The device 7 corresponding for example to a personal computer PC, a laptop or a game console.

The device 7 comprises the following elements, connected together by an address and data bus 75 which also transports a clock signal:

- a microprocessor 71 (or CPU);
- a graphics card 72 comprising:
    - several graphics processing units 720 (or CPUs);
    - a random access memory of the GRAM ("Graphical Random Access Memory") type 721;
- a non-volatile memory of the ROM ("Read Only Memory") type 76;
- a random access memory or RAM 77;
- one or more I/O ("Input/Output") devices 74, such as for example a keyboard, a mouse, a webcam; and a power supply 78.

The device 7 also comprises a display device 73 of the display screen type directly connected to the graphics card 72 to display in particular the rendering of computer-generated graphics calculated and composed in the graphics card, for example in live. The use of a dedicated bus to connect the display device 73 to the graphics card 72 offers the advantage of having much higher data transmission rates and of diminishing in this way the latency time for the display of images composed by the graphics card. According to one variant, a device to display is external to the device 7 and is connected to the device 7 by a cable transmitting the display signals. The device 7, for example the graphics card 72, comprises a transmission media or connector (not represented on FIG. 7) suited to transmit a display signal to an external display means such as for example an LCD or plasma screen, a video projector.

It is noted that the word "register" used in the description of memories 72, 76 and 77 designates in each of the mentioned memories a memory zone of low capacity (some binary data) as well as a memory zone of large capacity (enabling a whole program to be stored or all or part of the data representative of data calculated or to be displayed).

When powered up, the microprocessor 71 loads and runs the instructions of the program contained in the RAM 77.

The random access memory 77 comprises in particular:
in a register 770, the operating program of the microprocessor 71 responsible for switching on the device 7,
parameters 771 representative of the participating media 10 (for example, parameters of density, light absorption coefficients and light diffusion coefficients).

The algorithms implementing the steps of the method specific to the invention and described below are stored in the GRAM memory 77 of the graphics card 72 associated with the device 7 implementing these steps. When powered up and once the parameters 770 representative of the media are loaded into RAM 77, the graphics processing units 720 of the graphics card 72 load these parameters into GRAM 721 and execute the instructions of these algorithms in the form of microprograms of the "shader" type using the HLSL ("High Level Shader Language") language, the GLSL ("OpenGL Shading language") language for example.

The GRAM random access memory 721 comprises in particular:
in a register 7210, the parameters representative of the media 10,
the parameters 7211 representative of the bounding box (for example the coordinates of a point associated with one of the angles with values representative of the width, height and depth of the box),
parameters 7212 representative of the first, second, third and/or fourth intersection points (for example the coordinates of the intersection points),
values 7213 representative of distances between the surface of the bounding box 30 and the outer envelope of the media 10,
projection coefficients 7214 representative of the distance values between the surface of the bounding box 30 and the outer envelope of the media 10, and
of values 7215 representative of the quantity of light diffused by the media 10 along one or more directions of observation.

According to a variant, a part of the RAM 77 is assigned by the CPU 71 for storage of the parameters 7211, 7212 and the values 7213, 7214 and 7215 if the memory storage space available in GRAM 721 is insufficient. This variant however brings about longer latency times in the composition of an image comprising a representation of the media 10 composed from the microprograms contained in the GPU since the data must be transmitted from the graphics card to the random access memory 77 by means of the bus 75 whose transmission capacities are generally lower than those available in the graphics card to transfer the data from the GPU to the GRAM and vice-versa.

According to another variant, the power supply 78 and/or the display 73 are external to the device 7.

FIG. 8 shows a method for rendering a participating media 10 implemented in a receiver 7, according to a first non-restrictive particularly advantageous embodiment of the invention.

During an initialization step 80, the various parameters of the device 7 are updated. In particular, the parameters representative of the participating media 10 are initialized in any way.

Next, during a step 81, at least one half-sphere centred on a point of the volume formed by a bounding box surrounding the participating media 10 is defined by a plurality of directions having for origin the point of the volume. According to a first embodiment, the point of the volume formed the bounding box corresponds to the centre of the bounding box, particularly when the participating media is far from a viewpoint, that is at a distance greater than a second threshold value from which the participating media is rendered. According to this embodiment, two half-spheres forming a sphere are defined by the plurality of directions. According to a second embodiment, several half-spheres centred on points of the surface of the bounding box are defined by a plurality of directions each having for origin one of the points of the surface of the bounding box. This second embodiment is advantageous when the participating media is located at a mean distance from the viewpoint, that is at a distance less than the second threshold value defined in the first embodiment but greater than a third threshold value.

Then, during a step 82, a first intersection point is estimated for one or more of the directions forming the half-sphere or half-spheres defined during the previous step. The number of directions is chosen according to the calculation capacities of the device on which the method is implemented and/or according to the quality of the representation or rendering of the participating media required, the greater the number of directions, the more costly the calculations and the higher the quality. The estimated intersection point corresponds, for a given direction of a half-sphere, to the intersection between the considered direction and the participating media when the considered direction goes from a second intersection point corresponding to the intersection between the considered direction and the surface of the bounding box. In the case of the second embodiment, this second intersection point corresponds to the centre of the half-sphere comprising the considered direction. The first intersection point is advantageously estimated by covering the considered direction by starting from the second intersection point and corresponds to the first point of this direction meeting a criterion relating to the density information that is associated with it, that is, to the first point for which the density value that is associated with it is greater than a first density threshold value. Once the first intersection point is determined, the distance separating the first intersection point is determined before being stored in memory. The determination of a plurality of distances between the first and second intersection point for a plurality of directions can define the outer form of the participating media by taking as reference the surface of the bounding box. In other words, this means defining a limit function representative of the shape or the envelope of the participating media. According to a variant, in order to save memory resources, this limit function is represented in the space of a function base by a set of projection coefficients. The storage of projection coefficients uses less memory space than the storage of values distances separating the first and second intersection points, while enabling this distance information to be recovered.

Finally, during a step 83, two third intersection points are estimated from the information representative of distances separating the first and second intersection points, that is from distance values themselves or from projection coefficients representative of these distance values. The two third intersection points correspond to the intersections between on the one hand a viewing direction according to which the media is observed from a given viewpoint and on the other hand the outer envelope of the participating media defined by the previously estimated distance information.

According to a variant, the method also comprises a sampling step of the straight line segment comprised between the two third intersection points, that is the straight line segment corresponding to the intersection formed by the viewing direction and the volume formed by the participating media 10. The sampling of the participating media according to the viewing direction advantageously enables the quantity of light diffused by the participating media along the direction of observation to be calculated so as to render the participating media on a pixel of an image plane corresponding to the direction of observation. The steps for determining the third intersection points and sampling of the participating media are advantageously reiterated for a plurality of directions of observation in order to render a full image of the participating media 10.

Naturally, the invention is not limited to the embodiments previously described. In particular, the invention is not limited to a method for rendering a participating media but also extends to a method for modelling or representing a participating media, whether it is a homogeneous or heterogeneous participating media. The invention also extends to any device implementing this method and particularly all the devices comprising at least one GPU, to the computer program products comprising program code instructions for executing the steps of the method for rendering or modelling together with any storage means (for example of the RAM or GRAM type, flash memory, CD, DVD) on which are stored the executable instructions for implementing the method for rendering or modelling. The implementation of the steps described with regard to FIGS. 1 to 6 is not limited either to an implementation in shader type microprograms but also extends to an implementation in any program type, for example programs that can be executed by a CPU type microprocessor.

Advantageously, the base functions used for the estimation of the coefficients of projection are functions of the spherical or hemispherical harmonic type or of the spherical or hemispherical wavelet type.

The use of the invention is not limited to a live use but also extends to any other use, for example for so-called post-production processing operations in a recording studio for the rendering of computer generated pictures for example. The implementation of the invention in post-production offers the advantage of giving an excellent visual rendering in terms of realism in particular while reducing the necessary calculation times.

The invention also relates to a method for composing a video image, in two dimensions or in three dimensions, for which the quantity of light diffused by a heterogeneous participating media is calculated and the information representative of the light that results is used for the displaying of pixels of the image, each pixel corresponding to an direction of observation according to an direction of observation $\omega_{out}$. The calculated light value for displaying by each of the pixels of the image is re-calculated to adapt to the different viewpoints of the spectator.

The present invention can be used in video game applications for example, whether by programs executable in a computer of the PC or laptop type, or in specialized game consoles producing and displaying live images. The device 7 described with respect to FIG. 7 advantageously has interaction means, such as keyboard and/or joystick, other modes to enter commands such as for example voice recognition being also possible.

The invention claimed is:

1. A method of displaying an image representative of a virtual scene comprising a participating media, the participating media being delimited by a bounding box, said participating media rendered from a viewpoint at a determined distance from the viewpoint according to a viewing direction, wherein the method comprises:
   for at least one point of a volume formed by said bounding box, determining a set of directions having for origin said at least one point distributed according to at least one half-sphere of which a base is centered on said at least one point;
   for each direction of at least one part of the set of determined directions, determining a first intersection point, corresponding to the intersection between said direction and said participating media, for which an associated density value is greater than a first threshold value, said first intersection point being determined by starting from a second intersection point corresponding to the intersection between said direction and said bounding box;
   determining third intersection points, corresponding to the intersections between said viewing direction and said participating media, from an item of information representative of distances separating the first intersection point from the second intersection point for each direction of the at least one part of the of determined directions, said item of information representative of distances being stored in a memory; and
   displaying pixels of said image, light values associated with said pixels being calculated according to said third intersection points.

2. The method according to claim 1, further comprising determining projection coefficients in a functions base from values representative of a distance separating the first intersection point from the second intersection point, said item of information representative of distances corresponding to the determined projection coefficients.

3. The method according to claim 2, wherein said functions base is a spherical functions base.

4. The method according to claim 1, wherein the distance separating said participating media from said viewpoint according to the viewing direction being greater than a second threshold value, said at least one point of the volume formed by said bounding box corresponds to a center of the bounding box, the set of determined directions being distributed according to a sphere centered on the center of the bounding box.

5. The method according to claim 1, wherein, the distance separating said participating media from the viewpoint according to the viewing direction being less than a second threshold value and greater than a third threshold value, the method comprises sampling a surface of said bounding box into a plurality of samples, a set of directions being determined for a plurality of points corresponding to at least a part of the plurality of samples, each set of directions being determined according to a half-sphere centered on a considered sample of the plurality of samples, the base of the half-sphere belonging to the surface of the bounding box, the half-sphere being oriented toward the inside of said bounding box, the third intersection points are moreover determined from a fourth intersection point corresponding to the intersection between the viewing direction and the bounding box.

6. The method according to claim 5, wherein when the fourth intersection point does not correspond to one of the samples of the surface of the bounding box, the method comprises determining a sample of the surface of the bounding box corresponding to the fourth intersection by interpolation of the samples surrounding said fourth intersection point.

7. The method according to claim 1, further comprising sampling said viewing direction between the determined third intersection points.

8. The method according to claim 1, wherein said participating media is a heterogeneous participating media.

9. A non-transitory computer-readable medium comprising a computer program product recorded thereon and capable of being run by a processor, including program code instructions for implementing the method according to claim 1.

10. A device configured to display an image representative of a virtual scene comprising a participating media comprised in a scene, the participating media being delimited by a bounding box, said participating media being rendered from a viewpoint at a determined distance from the viewpoint according to a viewing direction, wherein the device comprises at least one processor configured to:

determine, for at least one point of a volume formed by said bounding box, a set of directions having for origin said at least one point and distributed according to at least one half-sphere of which a base is centered on said at least one point;

determine, for each direction of at least one part of the set of determined directions, a first intersection point, corresponding to the intersection between said direction and said participating media, for which an associated density value is greater than a first threshold value, said first intersection point being determined by starting from a second intersection point corresponding to the intersection between said direction and said bounding box;

determine third intersection points, corresponding to the intersections between said viewing direction and said participating media, from an item of information representative of distances separating the first intersection point from the second intersection point for each direction of the at least one part of the set of determined directions, said item of information representative of distances being stored in a memory; and display pixels of said image, light values associated with said pixels being calculated according to said third intersection points.

11. The device according to claim 10, wherein the at least one processor is further configured for estimating to determine projection coefficients in a functions base from values representative of a distance separating the first intersection point from the second intersection point.

12. The device according to claim 11, wherein said functions base is a spherical functions base.

13. The device according to claim 10, wherein the at least one processor is further configured for sampling the surface of said bounding box and a plurality samples.

14. The device according to claim 10, wherein the at least one processor is further configured for sampling said viewing direction between the estimated determined third intersection points.

15. The device according to claim 10, wherein the distance separating said participating media from said viewpoint according to the viewing direction being greater than a second threshold value, said at least one point of the volume formed by said bounding box corresponds to a center of the bounding box, the set of determined directions being distributed according to a sphere centered on the center of the bounding box.

16. The device according to claim 10, wherein the distance separating said participating media from the viewpoint according to the viewing direction is less than a second threshold value and greater than a third threshold value, the at least one processor being further configured to:

sample a surface of said bounding box into a plurality of samples, a set of directions being determined for a plurality of points corresponding to at least a part of the plurality of samples, each set of directions being determined according to a half-sphere centered on a considered sample of the plurality of samples, the base of the half-sphere belonging to the surface of the bounding box, the half-sphere being oriented toward the inside of said bounding box, the third intersection points is moreover determined from a fourth intersection point corresponding to the intersection between the viewing direction and the bounding box.

17. The device according to claim 16, wherein when the fourth intersection point does not correspond to one of the samples of the surface of the bounding box, the at least one processor is further configured to determine a sample of the surface of the bounding box corresponding to the fourth intersection by interpolation of the samples surrounding said fourth intersection point.

18. The device according to claim 10, wherein said participating media is a heterogeneous participating media.

* * * * *